(12) United States Patent
Shirai

(10) Patent No.: US 6,763,249 B2
(45) Date of Patent: Jul. 13, 2004

(54) ELECTRONIC DEVICE AND UNIQUE INFORMATION MANAGEMENT METHOD

(75) Inventor: Kouji Shirai, Tokyo (JP)

(73) Assignee: NEC Corporation (JP)

( * ) Notice: Subject to any disclaimer, the term of this patent is extended or adjusted under 35 U.S.C. 154(b) by 692 days.

(21) Appl. No.: 09/785,682

(22) Filed: Feb. 16, 2001

(65) Prior Publication Data

US 2001/0016502 A1 Aug. 23, 2001

(30) Foreign Application Priority Data

Feb. 22, 2000 (JP) ........................................ 2000-044064

(51) Int. Cl.[7] .............................. H04Q 7/32; H04Q 7/20
(52) U.S. Cl. .................... 455/558; 455/550.1; 455/517; 455/412.1; 455/410; 455/411; 340/568.1; 340/539; 340/568.7; 235/380; 235/439; 235/475
(58) Field of Search .............................. 455/558, 550.1, 455/575.1, 403, 412.1, 410, 404.1, 411, 517; 340/568.1, 539, 568.7; 235/380, 439, 475, 482, 483, 486

(56) References Cited

U.S. PATENT DOCUMENTS 5,659,595 A * 8/1997 Chanu et al. ............... 455/411
5,778,321 A * 7/1998 Jouin et al. .................. 455/558
5,836,010 A 11/1998 Kim

FOREIGN PATENT DOCUMENTS

| DE | 19818846 | 11/1999 |
| EP | 0822730 | 7/1997 |
| EP | 1035740 | 3/2000 |
| JP | 3-50622 | 3/1991 |
| JP | 6-296161 | 10/1994 |
| WO | WO-98/41050 | 9/1998 |

OTHER PUBLICATIONS

Copy of Japanese Office Action dated Dec. 24, 2002 and translation of relevant portion.

European Search and Examination Report dated Nov. 28, 2001.

* cited by examiner

Primary Examiner—William Trost
Assistant Examiner—Keith Ferguson
(74) Attorney, Agent, or Firm—Dickstein, Shapiro, Morin & Oshinsky, LLP.

(57) ABSTRACT

An electronic device includes a device main body, card controller, and device controller. The use of the device main is permitted by inserting an authentic user identification card on which personal information of a holder is recorded. The card controller detects removal/insertion of the user identification card from/into the device main body during a power-off state. The device controller displays a warning representing removal/insertion of the card on the basis of the detection result of the card controller in power-on operation. A unique information management method for the electronic device is also disclosed.

17 Claims, 3 Drawing Sheets

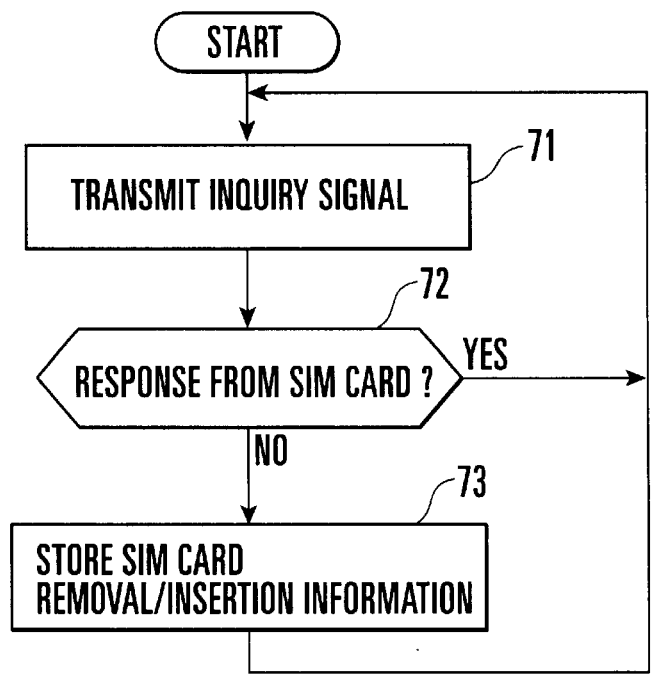
F I G. 3
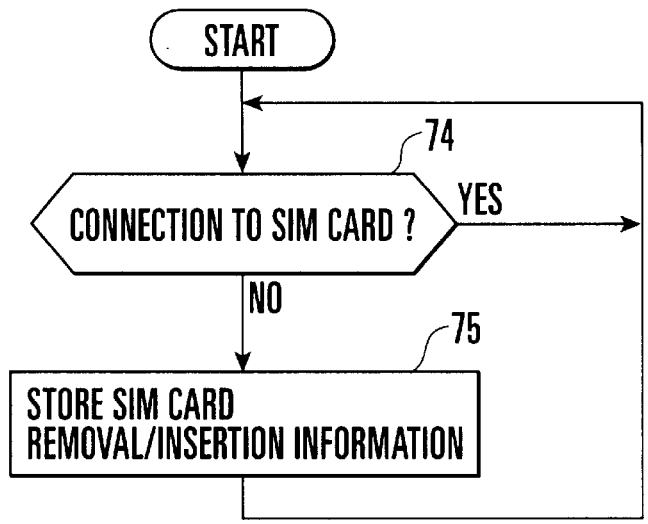
F I G. 4

ELECTRONIC DEVICE AND UNIQUE INFORMATION MANAGEMENT METHOD

BACKGROUND OF THE INVENTION

The present invention relates to an electronic device such as a portable telephone which permits the use of the electronic device when an authentic user identification card on which personal information of the holder (subscriber) is recorded, and a unique information management method.

In recent years, people often carry cards such as credit cards on which personal information is recorded. Along with this, crimes of illicit copy and misuse of cards without any permission of authentic holders are increasing. In the field of electronic devices such as portable telephones, there is recently proposed a system of enabling communication by mounting a user identification card called a SIM (Subscriber Identity Module) card on a telephone main body. The SIM card on which personal information of the holder is recorded is always inserted into a telephone, and the telephone is turned on/off in accordance with whether the telephone is used or not.

Even if the user does not own a telephone, or the user cannot use his/her own telephone because of a dead battery or the like, the user can make speech communication using his/her own ID code by inserting his/her SIM card into the telephone of another person or a public telephone. In this case, charging processing can target the holder of the SIM card. Using a telephone owned by another person, the cardholder can make a call by one-touch operation on the basis of memory dial data stored in the SIM card.

Even such a convenient user identification card such as a SIM card may be illicitly copied and misused without any permission of the authentic holder, similar to a credit card. If the user identification card is lost, the authentic holder notifies the loss or theft of the card. However, if the card is returned after being removed from an electronic device and copied without any permission of the holder, the holder cannot recognize illicit copy of the card.

For this reason, the conventional system suffers the problem that an electronic device such as a portable telephone is misused to charge the card holder owing to the malicious intent of another person who illicitly copied the user identification card. The personal information of the authentic holder is read from the user identification card and leaks out.

SUMMARY OF THE INVENTION

It is an object of the present invention to provide an electronic device for preventing illicit copy of a user identification card or leakage of personal information recorded on a user identification card, and a unique information management method.

To achieve the above object, according to the present invention, there is provided an electronic device comprising a device main body whose use is permitted by inserting an authentic user identification card on which personal information of a holder is recorded, card control means for detecting removal/insertion of the user identification card from/into the device main body during a power-off state, and device control means for displaying a warning representing removal/insertion of the card on the basis of a detection result of the card control means in power-on operation.

BRIEF DESCRIPTION OF THE DRAWINGS

FIG. 3 is a flow chart showing a control operation of a SIM card controller in FIG. 1;

FIG. 4 is a flow chart showing another control operation of the SIM card controller in FIG. 1;

DESCRIPTION OF THE PREFERRED EMBODIMENTS

The present invention will be described in detail below with reference to the accompanying drawings.

Figure 1:
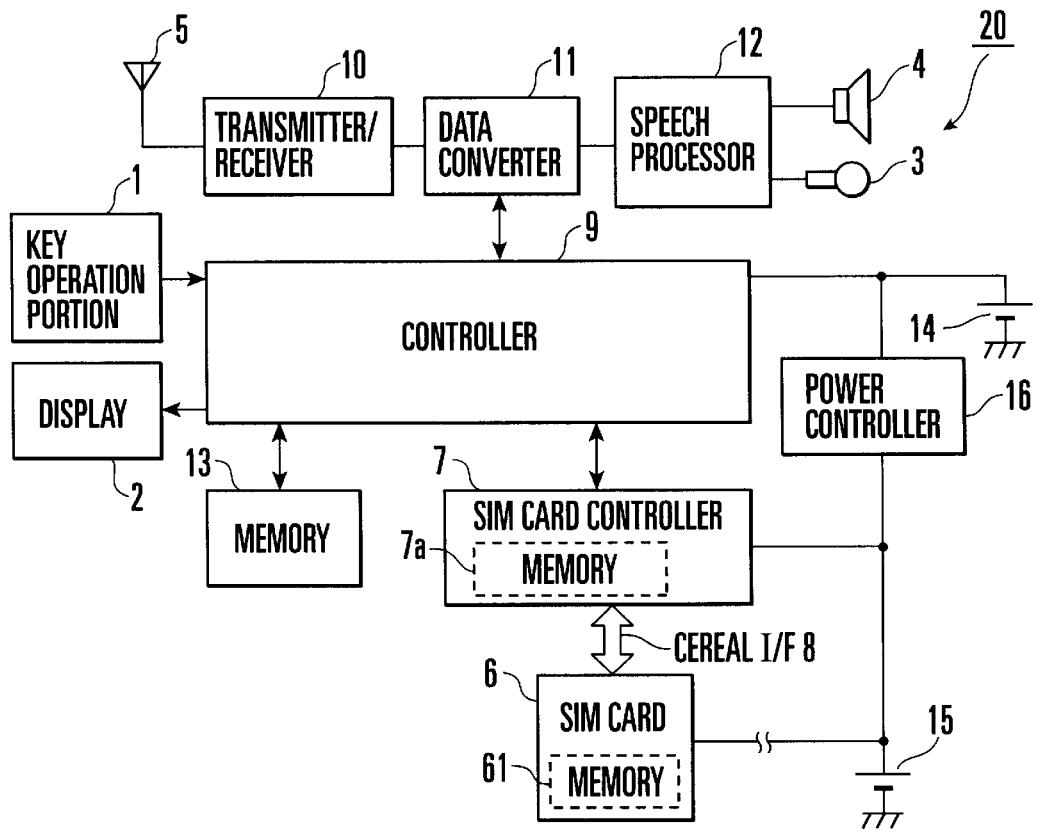
FIG. 1 is a block diagram showing a portable telephone according to an embodiment of the present invention.
Figure 2:
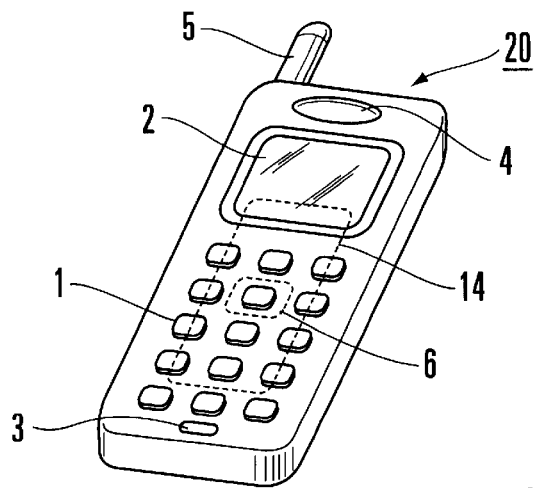
FIG. 2 is a perspective view showing the portable telephone in FIG. 1.

FIG. 1 shows a portable telephone according to an embodiment of the present invention, and FIG. 2 shows the portable telephone in FIG. 1. This embodiment will exemplify a portable telephone as an example of an electronic device.

As shown in FIG. 2, a portable telephone 20 has a key operation portion 1 and display 2 which are arranged on upper and lower portions of the front surface. The key operation portion 1 includes many dial keys corresponding to figures, characters, and various other symbols such as "#" and "*", power switches, and the like. The display 2 is formed from a liquid crystal display device, and displays various messages on the screen.

A microphone 3 for inputting speech to be transmitted is arranged at the lower portion of the portable telephone 20, and a loudspeaker 4 for outputting a speech signal such as received speech or a ringing tone is arranged above the display 2. An antenna 5 is freely extendably attached to the upper end of the portable telephone 20. A slot (not shown) for detachably inserting a SIM card 6 is formed on the back side of the portable telephone 20. The SIM card 6 is inserted into the slot to make electrical connection to a SIM card controller 7 via a serial interface (to be referred to as a serial I/F hereinafter) 8.

As shown in FIG. 1, the SIM card 6 incorporates a nonvolatile memory 61 which stores personal information such as a telephone number, the account number of a bank, or a telephone directory. The SIM card controller 7 always monitors via the serial I/F 8 whether the SIM card 6 is inserted into the slot.

In addition to the key operation portion 1, display 2, SIM card 6, and SIM card controller 7, the portable telephone 20 comprises a controller 9 formed from a microcomputer or the like to control the overall portable telephone 20, the antenna 5, a transmitter/receiver 10 connected to the antenna 5, a data converter 11 connected to the transmitter/receiver 10, a speech processor 12 connected to the data converter 11, the microphone 3 and loudspeaker 4 that are connected to the speech processor, a memory 13, a primary battery 14, a secondary battery 15, and a power controller 16.

The key operation portion 1 is connected to the controller 9, and an operation signal from the key operation portion 1 is input to the controller 9. The display 2 is connected to the controller 9, and display operation of the display 2 is controlled by the controller 9. The memory 13 and SIM card controller 7 are connected to the controller 9. The memory 13 stores control programs for communication (speech communication and mail transmission/reception) and various data.

The slot of the SIM card 6 is formed on the back side of the primary battery 14, and exposed by removing the primary battery 14. The SIM card 6 is removed/inserted while the primary battery 14 is kept removed, so the SIM card 6 and SIM card controller 7 must operate even while the primary battery 14 is removed. Thus, the SIM card 6 and SIM card controller 7 receive power from the secondary battery 15 mainly used to back up a timepiece function in the portable telephone.

The primary battery 14 is connected to the controller 9, and the secondary battery 15 is connected to the SIM card 6 and SIM card controller 7. The power controller 16 is connected between the primary battery 14 and the secondary battery 15. In this connection, the power controller 16 converts the voltage of the primary battery 14 into a predetermined power supply voltage, and supplies the power supply voltage to the respective building circuits of the portable telephone 20 including the controller 9. When the primary battery 14 is mounted in the portable telephone 20, the power controller 16 supplies a voltage from the primary battery 14 to the SIM card 6 and SIM card controller 7. When the primary battery 14 is removed, the power controller 16 supplies a voltage from the secondary battery 15 to the SIM card 6 and SIM card controller 7.

The operation of the portable telephone 20 having this arrangement will be described with reference to the flow chart shown in FIG. 3.

While the portable telephone 20 is OFF, the SIM card controller 7 periodically transmits an inquiry signal to the SIM card 6 via the serial I/F 8 (step S71), and checks whether the SIM card 6 responds to the inquiry signal (step S72). With this operation, the SIM card controller 7 always monitors whether the SIM card 6 is inserted into the slot. If the SIM card 6 does not respond, the SIM card controller 7 determines that the SIM card 6 is not connected and is removed from the slot, and stores in a memory 7a the current time and position information (base station number) of the portable telephone 20 sent from a corresponding base station (step S73).

In this manner, the memory 7a stores SIM card removal/insertion information including the removal time of the SIM card 6 and position information of the portable telephone 20 at that time. Note that the SIM card removal/insertion information may be only the time or the date and time. The SIM card controller 7 may monitor whether the SIM card 6 is inserted into the slot only when the primary battery 14 is removed. In this case, power consumption can be suppressed.

A signal received by the antenna 5 as position information of the portable telephone 20 is decoded by the transmitter/receiver 10, and necessary information is extracted from the decoded signal by the data converter 11. The extracted position information is sent to the SIM card controller 7 via the controller 9. Note that position information is periodically transmitted from the base station. As soon as position information changes, it is sent to the SIM card controller 7 via the controller 9 to always hold the latest position information in the memory 7a of the SIM card controller 7.

If the SIM card 6 does not respond, the SIM card controller 7 copies the current position information stored in a given area of the memory 7a to another area of the memory 7a, thereby storing the current position information as SIM card removal/insertion information. Note that the latest position information and SIM card removal/insertion information are stored in different areas of the memory 7a, but may be respectively stored in two independent memories.

Another operation of the SIM card controller 7 will be explained with reference to the flow chart shown in FIG. 4. The SIM card controller 7 checks the physical connection state (e.g., voltage) of the terminal of the serial I/F 8, and always monitors whether the serial I/F 8 is connected to the SIM card, i.e., the SIM card 6 is inserted into the slot (step S74). If the SIM card 6 is not connected to the serial I/F 8, the SIM card controller 7 stores the current time and current position information as SIM card removal/insertion information in the memory 7a (step S75).

Figure 5:
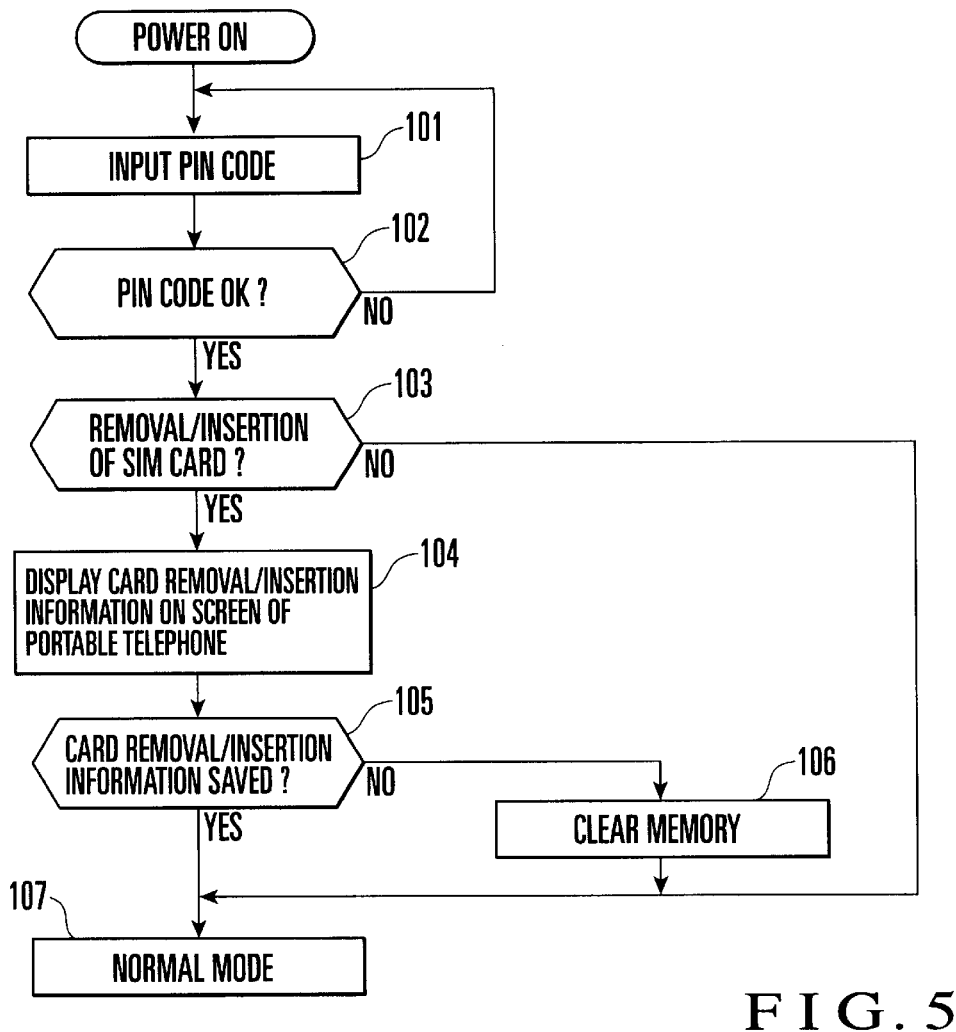
FIG. 5 is a flow chart showing the control operation of a controller when the power switch is pressed.

The operation of the portable telephone 20 when the power switch of the key operation portion 1 is pressed will be described with reference to FIG. 5. If the power switch of the key operation portion 1 is pressed, the controller 9 of the portable telephone 20 displays a message prompting input of a PIN code (password number) on the screen of the display 2. In response to this, the user of the portable telephone 20 operates the key operation portion 1 to input the PIN code (step S101).

The controller 9 collates the PIN code input from the key operation portion 1 with a PIN code registered in the SIM card 6, and determines whether the user is authentic (step S102). If the input PIN code is correct, the controller 9 refers to the SIM card controller 7 to check whether the SIM card 6 was removed and inserted before power-on operation (step S103). That is, the controller 9 checks whether the memory 7a stores SIM card removal/insertion information.

If the memory 7a stores SIM card removal/insertion information, the controller 9 determines that the SIM card 6 was removed and inserted before power-on operation, and displays the SIM card removal/insertion information on the screen of the display 2 (step S104). The controller 9 displays a message on the screen of the display 2 to confirm whether the SIM card removal/insertion information is saved (step S105).

If the user designates saving of the information by operating the key operation portion 1, the SIM card removal/insertion information is kept saved in the memory 7a, and can always be checked. If the user designates erase of the information by operating the key operation portion 1, the controller 9 erases the SIM card removal/insertion information stored in the memory 7a via the SIM card controller 7 (step S106). Then, the controller 9 enters a normal mode in which communication is done (step S107).

If the memory 7a does not store SIM card removal/insertion information (NO in step S103), the controller 9 determines that the SIM card 6 was not removed or inserted before power-on operation, and immediately enters the normal mode.

In the normal mode, a signal received by the antenna 5 is demodulated by the transmitter/receiver 10, and converted into speech data by the data converter 11. The converted speech data is converted into a transmission signal (analog speech signal) by the speech processor 12, and output from the loudspeaker 4. To the contrary, a reception signal (analog speech signal) input from the microphone 3 is converted into speech data by the speech processor 12, and converted into communication data by the data converter 11. The converted communication data is modulated by the transmitter/receiver 10, and transmitted from the antenna 5.

In mail reception, a signal received by the antenna 5 is demodulated by the transmitter/receiver 10, and converted into communication data. The converted communication data is converted into character data by the data converter 11, and displayed on the display 2. In mail transmission, character data input from the key operation portion 1 or stored in the memory 13 in advance is converted into communication data by the data converter 11. The converted communication data is modulated by the transmitter/receiver 10, and transmitted from the antenna 5.

As described above, in the portable telephone 20 of this embodiment, whether SIM card removal/insertion information is written in the memory 7a of the SIM card controller 7 is detected before a service starts upon power-on operation. Accordingly, whether the SIM card 6 was removed and inserted before power-on operation is determined. If the SIM card 6 is determined to have been removed and inserted, a card removal/insertion warning is issued by informing the user of SIM card removal/insertion information including the removal time of the SIM card 6 or the like.

If the user of the portable telephone 20 does not remember the removal/insertion represented by this warning, he/she can estimate when and where the SIM card 6 was removed by a third party, from the SIM card removal/insertion information displayed on the display 2. In this case, the user immediately takes the cancellation procedure of the SIM card 6 with respect to the company of the mobile communication system, and prevents misuse of the SIM card 6. If the card 6 is removed while the portable telephone 20 is ON, warning display including an alarm sound is sent right away.

In this embodiment, the removal time and position information of the SIM card 6 are stored as SIM card removal/insertion information in the memory 7a. Moreover, the field strength of the base station when the SIM card 6 was removed may be stored as SIM card removal/insertion information in the memory 7a. This field strength information can be obtained by the transmitter/receiver 10 which demodulates a signal received by the antenna 5, and is sent to the SIM card controller 7 via the controller 9. This enables further specifying the removal place of the SIM card 6.

Figure 6:
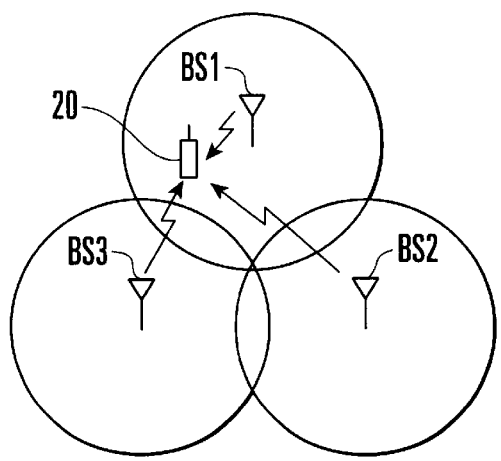
FIG. 6 is a view showing a state in which the portable telephone of the present invention receives radio waves from three base stations.

The field strengths of a plurality of base stations when the SIM card 6 was removed are stored as SIM card removal/insertion information in the memory 7a, which allows specifying the removal location of the SIM card 6 in more detail. For example, a W-CDMA (Wideband-Code Division Multiple Access) portable telephone 20 receives radio waves from three base stations BS1, BS2, and BS3, as shown in FIG. 6. Thus, the field strengths of the three base stations BS1 to BS3 when the SIM card 6 was removed can be stored as SIM card removal/insertion information in the memory 7a.

In this embodiment, SIM card removal/insertion information is written once. Alternatively, new SIM card removal/insertion information may be additionally written in the memory 7a every time removal/insertion of the SIM card 6 is detected. In this case, the log of SIM card removal/insertion information corresponding to the number of removal/insertion operations of the SIM card 6 can be recorded. Note that all the log of SIM card removal/insertion information may be erased at once in step S105 of FIG. 5, or part thereof may be erased.

In this embodiment, SIM card removal/insertion information is displayed. However, when specific information is not wanted to be recognized by the user, e.g., private information such as position information (base station number) or field strength information is not wanted to be recognized, only information which can be disclosed to the user (e.g., removal time of the SIM card 6) may be displayed without displaying these pieces of information. In this case, SIM card removal/insertion information such as position information or field strength information is analyzed when a person in charge of a mobile communication system company carries the portable telephone to the service center.

In this embodiment, the SIM card controller 7 detects removal/insertion of the SIM card 6 in power-off operation of the telephone, and displays removal/insertion information of the SIM card 6 as a warning. Alternatively, removal/insertion of the SIM card 6 may be detected regardless of power-on/off operation of the telephone. In this case, a warning is displayed in the first power-on operation after the SIM card 6 is removed/inserted.

This embodiment has exemplified a portable telephone as an example of an electronic device which permits its use when an authentic user identification card is inserted. The present invention is not limited to this, and may be applied to another electronic device. Position information includes position information representing a single radio zone, and position registration information including a plurality of radio zones.

As has been described above, according to the present invention, a warning is issued in power-on operation when removal/insertion of a user identification card before power-on operation is detected. This allows monitoring illicit removal/insertion of the user identification card. As a result, the user can recognize the possibility of misuse of the user identification card or leakage of personal information recorded on the user identification card.

Since removal/insertion information representing that the user identification card was removed and inserted before power-on operation is written in a memory means, the removal/insertion information can be saved and always be checked.

If removal/insertion information is written every time a detection means detects removal/insertion of the user identification card, the log of removal/insertion information corresponding to the number of removal/insertion operations of the user identification card can be recorded.

When removal/insertion information is information representing the removal time of the user identification card, the holder can know the time when the user identification card was illicitly removed and inserted.

When removal/insertion information is information representing the removal location of the user identification card, the holder can know the location where the user identification card was illicitly removed and inserted.

When removal/insertion information is information representing the field strength of the base station when the user identification card was removed, the holder can specify in more detail the location where the user identification card was illicitly removed and inserted.

What is claimed is:

1. An electronic device comprising:
    a device main body whose use is permitted by inserting an authentic user identification card on which personal information of a holder is recorded;
    card control means for detecting removal/insertion of the user identification card from/into said device main body during a power-off state; and
    device control means for displaying a warning representing removal/insertion of the card on the basis of a detection result of said card control means in power-on operation.

2. A device according to claim 1, wherein
    said device further comprises memory means for storing card removal/insertion information of the user identification card, and
    said card control means always monitors whether the user identification card is inserted in said device main body, and when removal/insertion of the card is detected, writes card removal/insertion information in said memory means.

3. A device according to claim 2, wherein said device control means displays a warning on the basis of the card removal/insertion information written in said memory means.

4. A device according to claim 2, wherein every time removal/insertion of the user identification card is detected, said card control means sequentially writes card insertion/removal information in the memory means, and creates a log of the card insertion/removal information.

5. A device according to claim 2, wherein said device main body includes a portable telephone which communicates with a base station by radio.

6. A device according to claim 5, wherein the card removal/insertion information includes at least one information selected from the group consisting of removal time of the user identification card, position information of the portable telephone, a removal location of the user identification card, and a reception field strength from the base station when the user identification card was removed.

7. A device according to claim 1, wherein said card control means periodically transmits a confirmation signal to the user identification card, and when said card control means does not receive any response to the confirmation signal, detects removal/insertion of the card.

8. A device according to claim 1, wherein said card control means always confirms a physical connection state to the user identification card, and when said card control means cannot confirm physical connection to the user identification card, detects removal/insertion of the card.

9. An electronic device which permits use when a user identification card on which personal information of a holder is recorded is inserted, comprising:
   detection means for detecting whether the user identification card was removed and inserted; and
   control means for displaying a warning including at least removal time of the user identification card when said detection means detects insertion/removal of the user identification card.

10. A unique information management method for an electronic device, comprising the steps of:
    permitting use of a device main body when an authentic user identification card on which personal information of a holder is recorded is inserted;
    detecting removal/insertion of the user identification card from/to the device main body during a power-off state; and
    displaying a warning representing removal/insertion of the card on the basis of a detection result in power-on operation.

11. A method according to claim 10, further comprising the steps of:
    always monitoring whether the user identification card is inserted in the device main body; and
    storing card removal/insertion information when removal/insertion of the card is detected.

12. A method according to claim 11, wherein the step of displaying a warning comprises the step of displaying a warning on the basis of the stored card removal/insertion information.

13. A method according to claim 11, wherein the storing step comprises the step of sequentially writing card insertion/removal information, and creating a log of the card insertion/removal information every time removal/insertion of the user identification card is detected.

14. A method according to claim 10, wherein the device main body includes a portable telephone which communicates with a base station by radio.

15. A method according to claim 14, wherein the card removal/insertion information includes at least one information selected from the group consisting of removal time of the user identification card, position information of the portable telephone, a removal location of the user identification card, and a reception field strength from the base station when the user identification card was removed.

16. A method according to claim 10, wherein the detecting step comprises the step of periodically transmitting a confirmation signal to the user identification card, and when no response to the confirmation signal is received, detecting removal/insertion of the card.

17. A method according to claim 10, wherein the detecting step comprises the step of always confirming a physical connection state to the user identification card, and when physical connection to the user identification card cannot be confirmed, detecting removal/insertion of the card.

* * * * *